United States Patent [19]

Jacques et al.

[11] Patent Number: 4,893,493

[45] Date of Patent: Jan. 16, 1990

[54] MECHANICALLY POWERED CRIMPING TOOL

[76] Inventors: Serge Jacques, 5142 Des Veterans, Lac Megantic, Quebec, Canada, G6B 2G5; Roger Boulanger, 210 Rang des Grenier, Piopolis, Quebec, Canada, G0Y 1H0

[21] Appl. No.: 284,571

[22] Filed: Dec. 15, 1988

[51] Int. Cl.[4] ......................... B23P 11/00; B23P 28/32

[52] U.S. Cl. ......................................... 72/325; 72/450; 72/444; 29/243.5

[58] Field of Search ................. 72/325, 407, 430, 444, 72/449, 451, 452; 29/243.56, 243.57, 243.5, 798, 432.1

[56] References Cited

U.S. PATENT DOCUMENTS

| | | | |
|---|---|---|---|
| 1,621,103 | 3/1927 | Brumell | 72/452 |
| 2,189,573 | 2/1940 | Wegner | 72/449 |
| 2,944,262 | 7/1960 | Richman et al. . | |
| 3,170,162 | 2/1965 | Balinski . | |
| 3,373,851 | 3/1968 | Baer . | |
| 3,397,567 | 8/1968 | Klingler | 72/449 |
| 4,052,875 | 10/1977 | Sakamoto | 72/444 |
| 4,670,957 | 6/1987 | Wolford | 29/243.5 |

OTHER PUBLICATIONS

Warner Electric Brake & Clutch Co., South Beloit, Illinois, "Wrap Spring Principle", D-2, D-3, PSi Series Specifications, D-13, CB-5 Specifications D-28, CB-5 Parts D-29.

*Primary Examiner*—Daniel C. Crane
*Attorney, Agent, or Firm*—Edwin E. Greigg

[57] ABSTRACT

There is disclosed a mechanically powered tool comprising a crimping device capable of shearing tines out of an angle-bar used for protecting a corner formed by two wall panels and driving the tines into the panels for fixing the angle-bar thereto; the crimping device including a rectilinearly reciprocable actuating rod movable in a working stroke. Operatively connected to one end of the actuating rod to displace it in its working stroke is a follower block of a movement-transforming device, which block is made to be displaced in a rectilinearly reciprocable motion; the transforming device further having a rotary input section. Connected to the latter is a rotary shaft of a single-revolution clutch which further has a rotary input section operatively connected for its rotation, to a rotary output member of a power assembly.

12 Claims, 4 Drawing Sheets

MECHANICALLY POWERED CRIMPING TOOL

BACKGROUND OF THE INVENTION

1. Field of the Invention

The present invention relates to a mechanically powered crimping tool for securing an angle-bar to a corner formed by two gypsum wall panels for protecting the corner.

2. Description of the Prior Art

Crimping tools of the above type are known but they are manually operable for operation either by hand or with the assistance of a hammer. Thus, a prior art search made by the present applicant has revealed U.S. Pat. Nos. 2,859,445 of Nov. 1st, 1958; 2,944,262 of July 12, 1960 and 3,170,162 of Feb. 23, 1965. The manual operation of these crimping tools is quite time consuming and very tiresome after a short while. It is precisely an object of the present invention to avoid these drawbacks by providing a crimping tool, for securing angle-bars to construction corners made by gipsum panels, which tool is entirely mechanically driven especially by a small electric motor thereby speeding up the angle-bar securing process while greatly relieving the tiresomeness associated with it.

Another object is to provide a tool which is quite compact and light so as to further reduce fatigue and thereby to increase production.

SUMMARY OF THE INVENTION

More specifically, the mechanically powered tool of the invention generally comprises a crimping device capable of shearing tines out of an angle-bar used for protecting a corner formed by two wall panels and driving the tines into the panels for fixing the angle-bar thereto; the crimping device including a rectilinearly reciprocable actuating rod movable in a working stroke; a movement-transforming device having an output section including a follower block displaceable in a rectilinearly reciprocable motion, the block being operatively connected to one end of the actuating rod to displace the rod in the working stroke; the movement-transforming device further having a rotary input section; a single-revolution clutch having a rotary shaft operatively connected to the rotary input section of the movement-transforming device; the clutch further having a rotary input section, and power means including a rotary member operatively connected to the rotary input section of the single-revolution clutch.

In a preferred form, the output section of the movement-transforming device further comprises: means constraining the follower block into the rectilinear reciprocable motion of the actuating rod, the block being formed with an elongated open slot extending in a direction normal to the motion, and the rotary input section of the movement-transforming device comprises: a disk fixed at the center thereof for rotation on the end of the rotary shaft of the clutch, and a roller mounted at the periphery of the disk, the roller being engaged in the open slot of the block, constructed so that, upon rotation of the disk, the roller moves back and forth in the slot and causes the follower block and the actuating rod to be displaced according to the stroke.

Preferably, the rotary input section of the clutch is a rotary driving hub mounted loosely over the rotary shaft and wherein the clutch further comprises: a driven hub fixed to the rotary shaft; a coil spring tightly wound over both of the driving and driven hubs for allowing rotation in unison of the hubs and the rotary shaft; a sleeve over the spring, the sleeve having a rib extending radially outwardly from the periphery thereof; wherein one end of the spring is fixed to the sleeve and the other end is fixed to the driven hub whereby to cause rotation of the sleeve when the hub and shaft are rotated by the driving hub; a control mechanism including a stop element and means for moving the stop element selectively in and out of engagement with the sleeve rib whereby, when the stop element engages the sleeve rib, the sleeve stops rotating, causing the coil spring to expand and to loosen from the driven hub under the action of the rotation of the driving hub and causing the driven hub and the shaft to stop rotating, the control mechanism being thus constructed for permitting rotation of the shaft through a single revolution only.

Preferably, the stop element has a core member made of magnetic material and the moving means comprise a solenoid having a winding within which the core extends when the solenoid is energized whereby to cause the element to move out of engagement with the sleeve rib, the moving means further comprising a return spring biasing the stop element toward the sleeve and in engagement with the sleeve rib when the solenoid is not energized.

Other features and advantages of the invention will become apparent from the description that follows of a preferred embodiment having reference to the appended drawings.

DESCRIPTION OF THE PREFERRED EMBODIMENT

Figure 1:
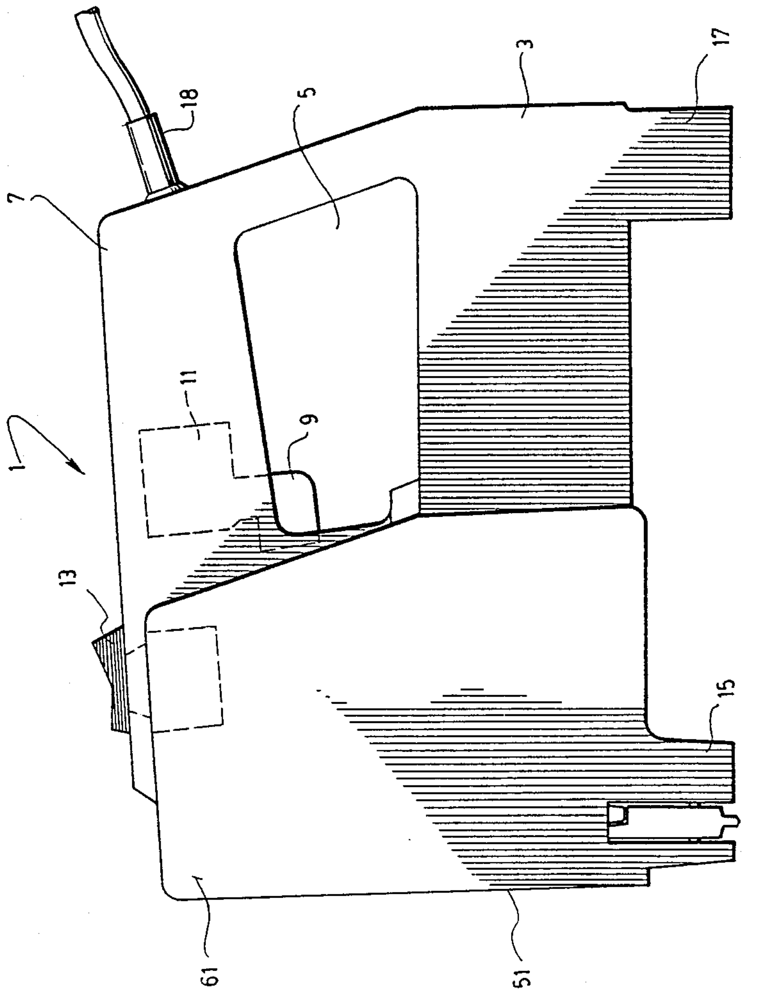
FIG. 1 is a side elevation view of a tool made according to the invention.

Referring to FIG. 1, the crimping tool 1 has a box-like casing 3 formed with a through hole 5 defining a handle 7. Jutting out of the casing 3 into the hole 5 is a trigger 9 for operating a switch 11 mounted in the circuit of a single-revolution clutch to which reference is made hereinafter. The top of the casing has an on-off switch 13 for actuating an electric motor also referred to below.

The bottom of the casing is formed with a pair of right-angular heads 15, 17, for application over an angle-bar to be fixed to two wall panels forming a construction corner as will be explained herein below. The casing 3 holds the various devices shown in FIGS. 2 to 6. An electric connection plug 18 is also mounted on the casing for feeding current to the electric motor and to the clutch aforesaid.

The illustrated crimping tool essentially comprises the crimping device 19 (FIGS. 3, 4) capable of shearing tines 21 out of an angle-bar 23 used for protecting a corner formed by two gypsum wall panels 25, 27, nailed to a wooden stud 29; these tines being driven into the panels toward one another so as to secure the angle-bar 23 safely to the panels 25, 27. The crimping device 19 includes a rectilinearly reciprocable actuating rod 31 movable in a working stroke, as shown by the straight arrow a. The actuating rod 31 is connected, at its upper end, to a follower block 33 in an output section 35 of a movement-transforming device 37 (see also FIG. 6); the block 33 being displaceable in the above-mentioned stroke of the rod 31. The movement-transforming device 37 further has a rotary input section 39 (FIG. 6) which is operatively connected to a rotary shaft 41 of a single-revolution clutch 43; the latter having a rotary input section 45 (FIG. 5) receiving its rotary power from a rotary member 46 of a motor assembly or means 47, shown in FIG. 2.

The output section 35 of the movement-transforming device 37 has means that constrain the follower block 33 into the rectilinear reciprocable motion of the actuating rod 31; such means being a pair of angle guide members 49 secured to the forward side plate 51 of the casing 3. It will be noted, from FIGS. 2 and 6, that the follower block 33 is formed with an elongated open or blind slot 53 that extends in a direction normal to the direction of motion of the block, i.e. transverse to it, and between two opposed sides of the blocks.

As said before, the follower block 33 is made fast with the upper end of the actuating rod 31. To ensure a smooth displacement of the block 33, the latter may be provided with a guide rod 55, upwardly extending from its top face and movable slidably across a bridge plate 57 fixed respectively to the forward side plate 51 of the casing 3 and an inner plate 59 within the casing; plate 59 being itself secured to a front plate 61 and to a ear plate 63 of the casing.

Figure 3:
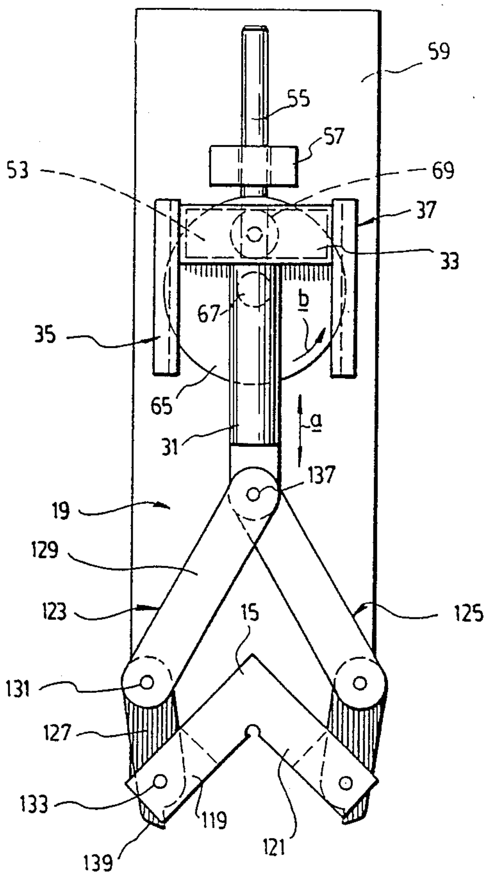
FIG. 3 is a side elevation view of the crimping device in inoperative position.

The rotary input section 39 of the movement-transferring device 37 essentially comprises a disk 65 fixed, at is center, to the end of a small diameter extension 67 of the shaft 41 of clutch 43 for rotation as shown by arrow b in FIG. 3. Section 39 comprises also a roller 69 mounted at the periphery of the disk 65 and rollably engaged in the blind slot 53; the roller being fixed to the disk in any convenient manner. As will be appreciated, this construction is such that it permits, upon rotation of the disk 65, the roller 69 to move back and forth in the slot 53 and thereby cause the follower block 33 and the actuating rod 31 to be displaced according to a stroke equal to the distance between the center of the disk and that of the roller.

Referring again to FIG. 2, the power assembly 47 is made up essentially of an electric motor 71, actuated for continued rotation by operation of the on-off switch 13, and a speed reducer 73 which comprises a pair of intermeshing pinion and gear sets 75, 77; the gear of the 77 being the rotary output member 46 mentioned previously and driving the rotary input section 45 of the clutch 43.

Figure 6:
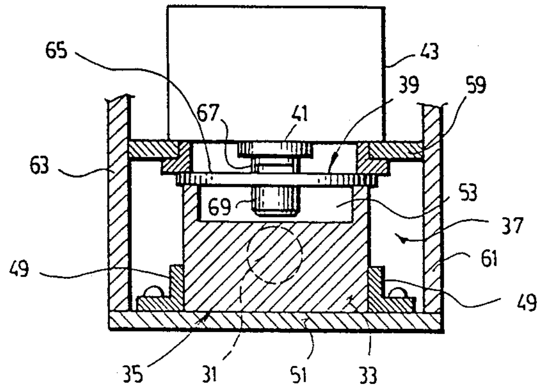
FIG. 6 is a cross-sectional view taken along line VI—VI of FIG. 2, mainly of the movement-transforming device.

FIG. 6 is a diagrammatic cross-section of the single-revolution clutch 43 showing its major components only. It is a clutch of the type sold by Precision Specialties, Inc. of PITMAN N.J., a corporation of Missouri. It is disclosed in full in U.S. Pat. No. 3,373,851 of Mar. 19, 1968 and of which the patentees are the said Precision Specialties. Inc. Its input section 43 is a driving hub driven into rotation by the output gear 46 of the speed reducer 73 to which it is connected in any known manner. The driving hub 45 is loosely mounted over the rotary shaft 41. The clutch also comprises a driven hub 79 which is fixed to the shaft 41 as with a spline connection 81. A coil spring 83, of which the spires have a square cross-section, is tightly wound over both the driving and the driven hubs 45, 79, which allows their rotation in unison when the spring is wound tight. A sleeve 85 lies over the spring 83 and has a rib 87 that radiallY projects from its outer periphery. One end 89 of the spring is bent radially outward and is lodged in groove 91 at one end of the sleeve. The other end 93 of the spring extends axially of the shaft 41 and lodges in a groove 95 formed along the bore of the driven hub 79. As thus described and in tightly wound condition of the spring 83, rotation of the driven hub 45 causes the rotation of the sleeve 85 and of course rotation of the driven hub 79, splined shaft 41, its extension 67 and, finally, disk 65 which in turn causes rectilinear displacement of the actuating rod 31 in its stroke, through the follower block 33.

The two hubs 45, 79, rotate in bearings 99, 101, fixed to the flanges 103, 105, of a channel fame 107 secured to the casing 3 in a convenient way.

The clutch 43 further has a control mechanism 109 which includes a stop element 111 fixed at the upper end of a core 113 made of magnetic material and moving within the winding of a solenoid 115 when the latter is energized by pressing the trigger 9 (FIG. 1) of which the corresponding switch 11 is of course properly mounted in the electric circuit of the solenoid. A return spring 117 biases the core 113 out of the solenoid toward the sleeve 85 when the operator releases the trigger 9 to deenergize the solenoid.

The relative positioning of the stop element 111 and of the rib 87 of the sleeve 85 is selected so that, in inactive condition where the solenoid 115 is not energized and where the driving hub 45 rotates by operation of the switch 13 to "on", the return spring 117 presses the stop element 111 against the sleeve 85 and in engagement with the rib 87 to stop the sleeve. The coil spring 83 then expands and loosens from the driving hub 45 under its rotation effect and the driven hub 79, shafts 41, 67, the movement-transforming device 37 and the crimping device 19 come to rest. When the operator presses on the trigger 9 to energize the solenoid 115, the core 113 moves out of the solenoid winding, the stop element 111 moves out engagement with the rib 87 and the tool 1 may resume its crimping work. Thus, the tool is constructed to permit rotation of the shaft 41 and of the disk 65 of the movement-transforming device through a single revolution only.

Figure 2:
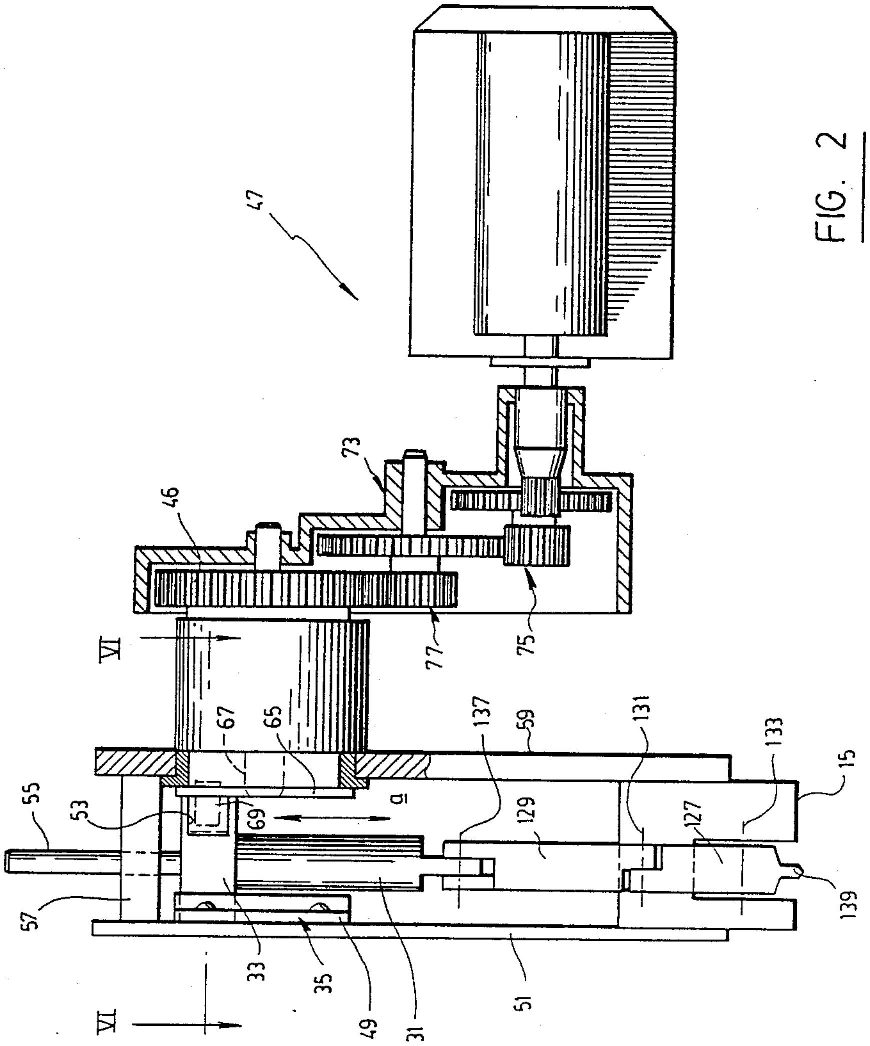
FIG. 2 is a diagrammatic side elevation of the tool of FIG. 1 with the casing removed.
Figure 4:
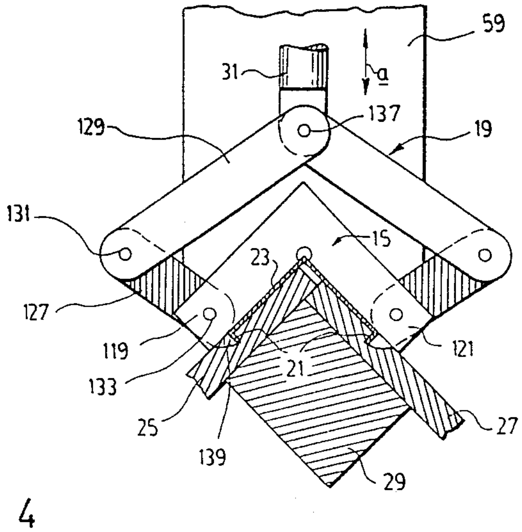
FIG. 4 is a side elevation view of the lower portion of the crimping device of FIG. 3 but in active crimping position.
Figure 5:
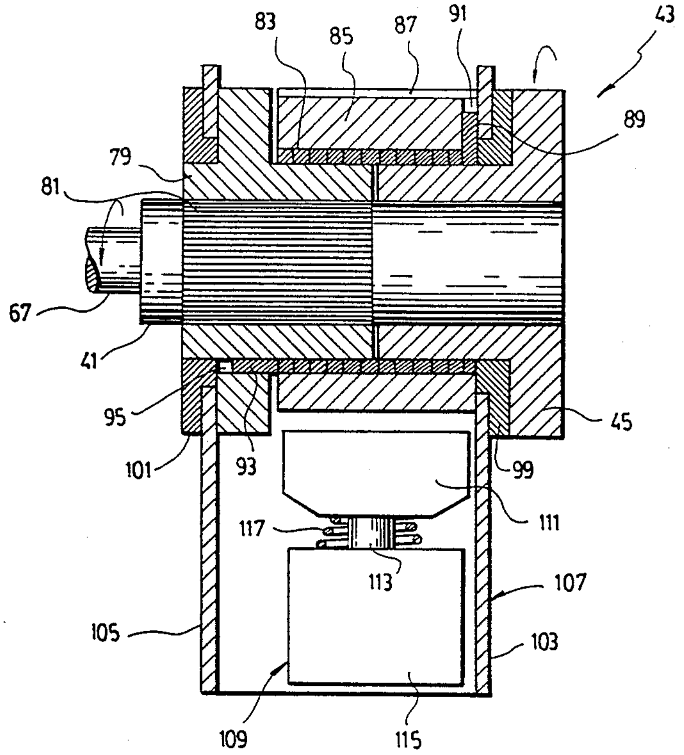
FIG. 5 is a vertical cross-sectional view of the single-revolution clutch, illustrated in diagrammatic form.

Referring to FIGS. 2, 3 and 4, it is seen that the angular head 15 is secured to plates 51, 59, and has a pair of flanges 119, 121, for application over the angle-bar 23. The device 19 has a pair of identical link connection 123, 125, so that only link connection 123 need be described. It is made up of a primary link 127 and of secondary link 129 pivoted together at 131, at their adjacent ends. The other end of the primary link 127 is pivoted, at 133, to the free end of the flange 119 of the head 15 while the other end of the secondary link 129 is pivoted, at 137, to the lower end of the actuating rod 31. A shearing knife 139 projects from the end of the primary link 127 pivoted to the head 15. The link connections 123, 125, are constructed so that they may be moved, in jack-knife fashion, by movement of the actuating rod 31 from a retracted position (FIG. 3) where the shearing knives are outside of stationarY head 15 to an active position (FIG. 4) where the knives are moved within the heat 15 thereby shearing the tines 21 out of the angle-bar 23 and simultaneously driving them into the panels 25, 27, as explained earlier; the operation taking place if desired within one revolution of the clutch 43 controlled by the trigger 9.

In the above description, reference has exclusively been made to an electric motor 71 connectable by a plug 18 to any electrical outlet as power means 47 for use to operate the tool. It must be understood however that the invention as claimed hereinafter is not limited in any way to such a power means. Indeed, it may be understood that use can also be made of a battery powered motor or of a pneumatic or hydraulic powered motor as power means 47 to operate the tool.

The embodiments of the invention in which an exclusive-property or privilege is claimed are defined as follows:

1. A mechanically powered tool comprising:

a crimping device capable of shearing tines out of an angle-bar used for protecting a corner formed by two wall panels and driving said tines into said panels for fixing said angle-bar thereto, said crimping device including a rectilinearly reciprocable actuating rod connected thereto and movable in a working stroke;

a movement-transforming device having an output section including a follower block displaceable in a rectilinearly reciprocable motion, said block being formed with an elongated open slot extending in a direction normal to said motion and being operatively connected to one end of said rectilinearly reciprocable actuating rod to displace said rod and said crimping device in said working stroke, said movement-transforming device further having a rotary input section;

a single-revolution clutch having a rotary shaft operatively connected to said rotary input section of said movement-transforming device, said clutch further having a rotary input section;

power means including a rotary member operatively connected to said rotary input section of said single-revolution clutch;

said output section of said movement-transforming device further comprises constraining means for constraining said follower block into said rectilinear reciprocable motion of said actuating rod; and said rotary input section of said movement-transforming device comprises a disk fixed at the center thereof for rotation on an end of said rotary shaft of said clutch, and a roller mounted at the periphery of said disk, said roller being engaged in said open slot of said follower block, constructed so that, upon rotation of said disk, said roller moves back and forth in said slot and causes said follower block, said actuating rod and said crimping device to be displaced according to said stroke.

2. A tool as claimed in claim 1, wherein said constraining means comprise a pair of guide numbers, each bearing against one side of said follower block; said elongated slot of said follower block extending between said follower block sides.

3. A tool as claimed in claim 2, wherein said elongated slot and said rotary disk are located opposite said guide members.

4. A tool as claimed in claim 1, wherein said power means comprises: an electric motor and a speed reducer operatively connected to said motor; said speed reducer including said rotary member connected to said input section of said clutch.

5. A tool as claimed in claim 1, wherein said rotary input section of said clutch is a rotary driving hub mounted loosely over said rotary shaft and wherein said clutch further comprises:

a driven hub fixed to said rotary shaft;

a coil spring tightly wound over both of said driving and driven hubs for allowing rotation in unison of said hubs and said rotary shaft;

a sleeve over said spring, said sleeve having a sleeve rib extending radially outwardly from the peripherY thereof;

wherein one end of said spring is fixed to said sleeve and the other end is fixed to said driven hub whereby to cause rotation of said sleeve when said hub and shaft are rotated by said driving hub;

a control mechanism including a stop element and means for moving said stop element selectively in and out of engagement with said sleeve rib whereby, when said stop element engages said sleeve rib, said sleeve stops rotating, causing said coil spring to expand and to loosen from said driven hub under the action of the rotation of said driving hub and causing said driven hub and said shaft to stop rotating, said control mechanism being thus constructed for permitting rotation of said shaft through a single revolution only.

6. A tool as claimed in claim 5, wherein said stop element has a core member made of magnetic material and said moving means comprise a solenoid having a winding within which said core extends when said solenoid is energized whereby to cause said element to move out of engagement with said sleeve rib, said moving means further comprising a return spring biasing said stop element toward said sleeve and in engagement with said sleeve rib when said solenoid is not energized.

7. A tool as claimed in claim 6, wherein said power means comprise: an electric motor and a speed reducer operatively connected to said motor; said speed reducer including said rotary member operatively connected to said rotary driving hub of said clutch.

8. A tool as claimed in claim 6, wherein said crimping device comprises:

said actuating rod;

a stationary right-angular head having a pair of flanges for application over an angle-bar to be fixed to two wall panels forming a construction corner;

a pair of like link connections, each connection comprising a primary link and a secondary link pivoted together at adjacent ends thereof, the other end of said primary link being pivoted to the free end of one of said flanges of said head and the other end of said secondary link being pivoted to the other end of said actuating rod;

a shearing knife projecting from said other end of each primary link;

constructed so that said link connections may be moved in jack-knife fashion, by movement of said actuating rod during said stroke, from a retracted position where said shearing knives are located outside of said stationary head to an active position where said knives are moved within said head thereby shearing tines out of the angle-bar and driving said tines into the two wall panels to which the angle-bar is to be secured.

9. A mechanically powered tool comprising:

a crimping device capable of shearing tines out of an angle-bar used for protecting a corner formed by two wall panels and driving said tines into said panels for fixing said angle-bar thereto, said crimping device including a rectilinearly reciprocable actuating rod connected thereto and movable in a working stroke;

a movement-transforming device having an output section including a follower block displaceable in a rectilinearly reciprocable motion, said block being operatively connected to one end of said rectilinearly reciprocable actuating rod to displace said rod and said crimping device in said working stroke, said movement-transforming device further having a rotary input section;

a single-revolution clutch having a rotary shaft operatively connected to said rotary input section of said movement-transforming device, said clutch further having a rotary input section; and power means including a rotary member operatively connected to said rotary input section of said single-revolution clutch, said rotary input section of said clutch is a rotary driving hub mounted loosely over said rotary shaft, and said clutch further comprises:

a driven hub fixed to said rotary shaft;

a coil spring tightly wound over both of said driving and driven hubs for allowing rotation in unison of said hubs and said rotary shaft;

a sleeve over said spring, said sleeve having a sleeve rib extending radially outwardly from the periphery thereof, wherein one end of said spring is fixed to said sleeve and the other end is fixed to said driven hub to thereby cause rotation of said sleeve when said hub and shaft are rotated by said driving hub; and a control mechanism including a stop element and means for moving said stop element selectively in and out of engagement with said sleeve rib whereby, when said stop element engages said sleeve rib, said sleeve stops rotating, causing said coil spring to expand and to loosen from said driven hub under the action of rotation of said driving hub and causing said driven hub and said shaft to stop rotating, said control mechanism being thus constructed for permitting rotation of said shaft through a single revolution only.

10. A tool as claimed in claim 9, wherein said stop element has a core member made of magnetic material and said moving means comprise a solenoid having a winding within which said core extends when said solenoid is energized whereby to cause said element to move out of engagement with said sleeve rib, said moving means further comprising a return spring biasing said stop element toward said sleeve and in engagement with said sleeve rib when said solenoid is not energized.

11. A tool as claimed in claim 10, wherein said power means comprise: an electric motor and a speed reducer operatively connected to said motor; said speed reducer including said rotary member operatively connected to said rotary driving hub of said clutch.

12. A tool as claimed in claim 10, wherein said crimping device comprises:

said actuating rod;

a stationary right-angular head having a pair of flanges for application over an angle-bar to be fixed to two wall panels forming a construction corner;

a pair of like link connections, each connection comprising a primary link and a secondary link pivoted together at adjacent ends thereof, the other end of said primary link being pivoted to the free end of one of said flanges of said head and the other end of said secondary link being pivoted to the other end of said actuating rod;

a shearing knife projecting from said other end of each primary link;

constructed so that said link connections may be moved in jack-knife fashion, by movement of said actuating rod during said stroke, from a retracted position where said shearing knives are located outside of said stationary head to an active position where said knives are moved within said head thereby shearing tines out of the angle-bar and driving said tines into the two wall panels to which the angle-bar is to be secured.

* * * * *